US008962787B2

(12) United States Patent
Fernandez et al.

(10) Patent No.: US 8,962,787 B2
(45) Date of Patent: Feb. 24, 2015

(54) CONTINUOUS PROCESS FOR THE PRODUCTION OF MELT POLYCARBONATE

(71) Applicant: SABIC Innovative Plastics IP B.V., Bergen op Zoom (NL)

(72) Inventors: Ignacio Vic Fernandez, Murcia (ES); Fernan Mateos Salvador, Alicante (ES); Mykhaylo Lyakhovych, Murica (ES); Sergio Ferrer Nadal, Motril (ES)

(73) Assignee: Sabic Global Technologies B.V. (NL)

( * ) Notice: Subject to any disclaimer, the term of this patent is extended or adjusted under 35 U.S.C. 154(b) by 0 days.

(21) Appl. No.: 13/982,537

(22) PCT Filed: Dec. 17, 2012

(86) PCT No.: PCT/IB2012/005739
§ 371 (c)(1),
(2) Date: Jul. 30, 2013

(87) PCT Pub. No.: WO2014/020384
PCT Pub. Date: Feb. 6, 2014

(65) Prior Publication Data
US 2014/0206833 A1    Jul. 24, 2014

(30) Foreign Application Priority Data
Jul. 30, 2012 (EP) ..................... 12382308

(51) Int. Cl.
*C08G 64/00* (2006.01)
*C08G 64/30* (2006.01)
*C08G 63/02* (2006.01)

(52) U.S. Cl.
CPC .................... *C08G 64/307* (2013.01)
USPC ........... 528/196; 528/126; 528/271; 528/272; 528/198

(58) Field of Classification Search
USPC .................. 528/126, 190, 193, 194, 196, 198
See application file for complete search history.

(56) References Cited

U.S. PATENT DOCUMENTS

| 2,063,450 A * | 12/1936 | Legg ............................ 435/153 |
| 5,921,089 A | 7/1999 | Kleinloh et al. |
| 6,307,004 B1 | 10/2001 | Carnahan et al. |
| 6,653,434 B2 * | 11/2003 | Brack et al. .................. 528/196 |
| 6,765,112 B1 | 7/2004 | Schultz |
| 7,067,610 B2 | 6/2006 | Vaporciyan |
| 2003/0032725 A1 | 2/2003 | Gaggar et al. |
| 2005/0176918 A1 | 8/2005 | Neumann et al. |
| 2009/0023884 A1 | 1/2009 | Vaporciyan |

FOREIGN PATENT DOCUMENTS

| EP | 1462438 A1 | 9/2004 |
| TW | 200837098 A | 9/2008 |
| WO | 2009010486 A1 | 1/2009 |

OTHER PUBLICATIONS

Extended European Search Report; European Application No. 12382308.0; Date of Mailing: Oct. 19, 2012; 5 Pages.
International Search Report; International Application No. PCT/IB2012/057399; International Filing Date: Dec. 7, 2012; Date of Mailing: Mar. 15, 2013; 5 Pages.
Written Opinion of the International Searching Authority; International Application No. PCT/IB2012/057399; International Filing Date: Dec. 7, 2012; Date of Mailing: Mar. 15, 2013; 4 Pages.
English Abstract of TW200837098; Published Sep. 16, 2008; 1 Page.

* cited by examiner

*Primary Examiner* — Terressa Boykin
(74) *Attorney, Agent, or Firm* — Cantor Colburn LLP (57) ABSTRACT

A method for producing polycarbonate by melt polymerization can comprise: (a) adding acetone, diaryl carbonate, and dihydroxy compound to the melt polymerization unit, wherein the acetone is added to the melt polymerization unit as a mixture with the diaryl carbonate and/or the dihydroxy compound; (b) adding a catalyst to the melt polymerization unit, optionally without separating out acetone prior to the addition of the catalyst; and (c) operating the melt polymerization unit under conditions so that the diaryl carbonate(s) and dihydroxy compound(s); dihydroxy compound reacts with the diaryl carbonate to produce polycarbonate with a desired specification, and a phenol by-product.

27 Claims, 5 Drawing Sheets

CONTINUOUS PROCESS FOR THE PRODUCTION OF MELT POLYCARBONATE

CROSS REFERENCE TO RELATED APPLICATIONS

The present application is a 371 of International Application No. PCT/IB2012/057399, filed Dec. 17, 2012, which claims priority to European Application No. 12382308.0, filed Jul. 30, 2012, both of which are hereby incorporated by reference in their entirety.

TECHNICAL FIELD

The present disclosure generally relates to a method of polymerizing polycarbonate and especially relates to producing polycarbonate from a mixture comprising DPC and/or BPA along with acetone.

BACKGROUND

Polycarbonate is widely used as a raw material in many different manufacturing sectors. It is believed that the demand for polycarbonate will increase significantly in the coming years and as such, improvements in the polymerization process are currently being developed.

Several processes for the production of polycarbonate are known. For instance, the reaction of phosgene with 2,2-bis (4-hydroxyphenyl)propane, also referred to as bisphenol A under phase transfer conditions. This process has the inherent drawbacks of employing phosgene and of creating chloride containing waste streams.

A different process that does not require the use of phosgene is based on the transesterification of bisphenol A with a dialkyl carbonate or a diaryl carbonate. The dialkyl carbonate has the disadvantage that in the transesterification with bisphenol A, it is not reactive enough to produce polymeric polycarbonate.

The use of a diaryl carbonate, for example diphenyl carbonate (DPC), has the advantage that it is reactive enough to form polymeric polycarbonate. Furthermore, phenol is liberated in the reaction of the diphenyl carbonate with bisphenol A to form polycarbonate. This phenol can be recycled and used in the production of, for example, bisphenol A or diphenyl carbonate that can be used as main raw material in the polymerization.

Due to the increasing demands on polycarbonate production, the process for production of polycarbonate leaves ample room for improvement, in particular in view of the way the raw materials are introduced.

SUMMARY

In an embodiment, a method for producing polycarbonate by melt polymerization, can comprise: (a) making a mixture containing acetone and diarylcarbonate; (b) transporting the mixture (e.g., in the liquid phase) to a polycarbonate production plant that carries out said melt polymerization; (c) adding the mixture to a melt polymerization unit; (d) adding a dihydroxy compound to the melt polymerization unit; (e) adding a catalyst to the melt polymerization unit; and (f) operating the melt polymerization unit under conditions so that the dihydroxy compound reacts with the diaryl carbonate to produce polycarbonate with a desired specification, and a phenol by-product.

In another embodiment, a method for producing polycarbonate by melt polymerization can comprise: (a) adding acetone, diaryl carbonate, and dihydroxy compound to the melt polymerization unit, without separating out acetone prior to the melt polymerization unit, wherein the acetone is added to the melt polymerization unit as a mixture with the diaryl carbonate and/or the dihydroxy compound; (b) adding a catalyst to the melt polymerization unit; and (c) operating the melt polymerization unit under conditions so that the dihydroxy compound reacts with the diaryl carbonate to produce polycarbonate with a desired specification, and a phenol by-product.

In still another embodiment, a method for producing polycarbonate can comprise: (a) adding a diaryl carbonate, a dihydroxy compound, and acetone to a melt polymerization unit, wherein the acetone is added as part of a mixture comprising the diaryl carbonate and/or the dihydroxy compound, and the acetone in an amount of greater than 3 weight % based upon a total weight of the mixture; (b) adding a catalyst to the melt polymerization unit; and (c) operating the melt polymerization unit under conditions so that the diaryl carbonate reacts with the dihydroxy compound to produce polycarbonate with a desired specification, and a phenol by-product.

In yet another embodiment, a method for producing polycarbonate by melt polymerization can comprise: adding a dihydroxy reactant and a diaryl carbonate ester to a melt polymerization unit, wherein at least one of the dihydroxy compound and the diaryl carbonate is added as a mixture with acetone, wherein the diaryl carbonate to dihydroxy reactant is present in a molar ratio of 2:1 to 1:2, and wherein the amount of acetone is adjusted in the polymerization unit such that the molar ratio of acetone to dihydroxy reactant is greater than or equal to 0.1:1; prior to separation or recovery of the acetone from the melt polymerization unit, reacting the dihydroxy compound and the diaryl carbonate in the presence of a catalyst to produce polycarbonate and at least a phenol by-product.

In yet another embodiment, a method for producing polycarbonate by melt polymerization can comprise: (a) adding acetone, diaryl carbonate, and dihydroxy compound to the melt polymerization unit, wherein the acetone is added to the melt polymerization unit as a mixture with the diaryl carbonate and/or the dihydroxy compound; (b) adding a catalyst to the melt polymerization unit, without separating out acetone prior to the addition of the catalyst; and (c) operating the melt polymerization unit under conditions so that the dihydroxy compound reacts with the diaryl carbonate to produce polycarbonate with a desired specification, and a phenol by-product.

The above described and other features are exemplified by the following figures and detailed description.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

To date, the processes for polymerizing polycarbonate have in common that large amounts of separate raw materials need to be produced, transported, and/or stored, or that several large production units must be combined on a single production site. Most of the raw materials used in polycarbonate production are solids at ambient temperature, which implies that if large amounts of these materials are transported, a number of problems arise that adversely affect the overall process, e.g., the economics. If the materials are to be shipped in the molten state, a large amount of energy is required to maintain the high temperatures, while solidifying the materials after their production requires large, complicated equipment such as cooling bands and/or prill towers. Such equipment unnecessarily increases the capital investment, and is also expensive and energy consuming to operate.

U.S. Pat. No. 7,067,610 and International Application No. 2009/010486 A1, which are herein incorporated in their entirety by reference, disclose that raw materials such as diphenyl carbonate and bisphenol A, respectively, can be transported it the molten liquid phase in acetone (e.g., wherein the phase is based upon the amount of acetone present), but disclose that the monomers have to be purified to greater than 97 weight % purity before their addition to a polymerization unit, requiring expensive, additional processing steps in the polymerization of polycarbonate.

It was surprisingly discovered that higher amounts of acetone can be fed directly into the polymerization unit without any detrimental effect on the polymerization reaction or to the product of the reaction. This means that monomer mixtures comprising greater than 3 weight %, specifically greater than or equal to 5 weight %, more specifically, greater than or equal to 10 weight % acetone can be introduced into the polymerization unit, effectively eliminating any previously required purification steps; i.e., eliminating the need to reduce the amount of acetone to less than 3 weight %, specifically less than 2 weight %, prior to the addition of the other reactant (e.g., the addition of the diaryl carbonate(s) or dihydroxy compound(s), whichever is not present with the acetone). Any acetone that is later recovered from the polymerization unit, along with any recovered phenol by-product, can be used in producing additional monomer. As is understood here, phenol by-product includes phenol itself, as well as a phenol containing compound formed from the reaction of diaryl carbonate(s) and dihydroxy compound(s); e.g., hydroxy containing aromatic compounds.

A "polycarbonate" means compositions having repeating structural carbonate units of formula (1)

(1)

in which the $R^1$ groups contain aliphatic, alicyclic, and/or or aromatic moieties (e.g., greater than or equal to 30 percent, specifically greater than or equal to 60 percent, of the total number of $R^1$ groups can contain aromatic moieties and the balance thereof are aliphatic, alicyclic, or aromatic). Optionally, each $R^1$ can be a $C_{6-30}$ aromatic group, that is, can contain at least one aromatic moiety. $R^1$ can be derived from a dihydroxy compound of the formula $HO-R^1-OH$, in particular of formula (2)

$$HO-A^1-Y^1-A^2-OH \qquad (2)$$

wherein each of $A^1$ and $A^2$ is a monocyclic divalent aromatic group and $Y^1$ is a single bond or a bridging group having one or more atoms that separate $A^1$ from $A^2$. One atom can separate $A^1$ from $A^2$. Specifically, each $R^1$ can be derived from a dihydroxy aromatic compound of formula (3)

(3)

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be single bond, $-O-$, $-S-$, $-S(O)-$, $-S(O)_2-$, $-C(O)-$, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. p and q can each be 1, and $R^a$ and $R^b$ are each a $C_{1-3}$ alkyl group, specifically methyl, disposed meta to the hydroxy group on each arylene group.

$X^a$ can be a substituted or unsubstituted $C_{3-18}$ cycloalkylidene, a $C_{1-25}$ alkylidene of formula $-C(R^c)(R^d)-$ wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula $-C(=R^e)-$ wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

$X^a$ can be a $C_{1-18}$ alkylene group, a $C_{3-18}$ cycloalkylene group, a fused $C_{6-18}$ cycloalkylene group, or a group of the formula $-B^1-G-B^2-$ wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. Two adjacent groups (e.g., $R^q$ and $R^t$ taken together) can form an aromatic group or $R^q$ and $R^t$ taken together can form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols (4) can be used in the manufacture of polycarbonates containing phthalimidine carbonate units of formula (4a)

(4a)

wherein $R^a$, $R^b$, p, and q are as in formula (4), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. The phthalimidine carbonate units can be of formula (4b)

(4b)

wherein $R^5$ is hydrogen or a $C_{1-6}$ alkyl. $R^5$ can be hydrogen. Carbonate units (4a) wherein $R^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin carbonate units of formula (4c) and (4d)

(4c)

(4d)

wherein $R^a$ and $R^b$ are each independently $C_{1-12}$ alkyl, p and q are each independently 0 to 4, and $R^i$ is $C_{1-12}$ alkyl, phenyl, optionally substituted with 1 5 to $C_{1-10}$ alkyl, or benzyl optionally substituted with 1 to 5 $C_{1-10}$ alkyl. $R^a$ and $R^b$ can each be methyl, p and q can each independently be 0 or 1, and $R^i$ can be $C_{1-4}$ alkyl or phenyl.

Examples of bisphenol carbonate units derived from bisphenols (4) wherein $X^b$ is a substituted or unsubstituted $C_{3-18}$ cycloalkylidene include the cyclohexylidene-bridged, alkyl-substituted bisphenol of formula (4e)

(4e)

wherein $R^a$ and $R^b$ are each independently $C_{1-12}$ alkyl, $R^g$ is $C_{1-12}$ alkyl, p and q are each independently 0 to 4, and t is 0 to 10. At least one of each of $R^a$ and $R^b$ can be disposed meta to the cyclohexylidene bridging group. $R^a$ and $R^b$ can each independently be $C_{1-4}$ alkyl, $R^g$ can be $C_{1-4}$ alkyl, p and q can each be 0 or 1, and t is 0 to 5. $R^a$, $R^b$, and $R^g$ can be each methyl, r and s can be each 0 or 1, and t can be 0 or 3, specifically 0.

Examples of other bisphenol carbonate units derived from bisphenol (4) wherein $X^b$ is a substituted or unsubstituted $C_{3-18}$ cycloalkylidene include adamantyl units (4f) and units (4g)

(4f)

(4g)

wherein $R^a$ and $R^b$ are each independently $C_{1-12}$ alkyl, and p and q are each independently 1 to 4. At least one of each of $R^a$ and $R^b$ can be disposed meta to the cycloalkylidene bridging group. $R^a$ and $R^b$ can each independently be $C_{1-3}$ alkyl, and p and q can be each 0 or 1. $R^a$, $R^b$ can be each methyl, p and q can each be 0 or 1. Carbonates containing units (4a) to (4g) are useful for making polycarbonates with high glass transition temperatures (Tg) and high heat distortion temperatures.

Other possible aromatic dihydroxy compounds of the formula HO—$R^1$—OH include compounds of formula (6)

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds (herein also referred to as dihydroxy reactants) include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis (4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. The polycarbonate can be a linear homopolymer derived from bisphenol A, in which each of $A^1$ and $A^2$ can be p-phenylene, and $Y^1$ can be isopropylidene in formula (3).

"Polycarbonates" includes homopolycarbonates (wherein each $R^1$ in the polymer is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

A specific type of copolymer is a polyester carbonate, also known as a polyester-polycarbonate. Such copolymers further contain, in addition to recurring carbonate chain units of formula (1), repeating units of formula (7)

(7)

wherein J is a divalent group derived from a dihydroxy compound, and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically 2, 3, or 4 carbon atoms; and T is a divalent group derived from a dicarboxylic acid, and can be, for example, a $C_{2-10}$ alkylene, a $C_{6-20}$ cycloalkylene, or a $C_{6-20}$ arylene. Copolyesters containing a combination of different T and/or J groups can be used. The polyesters can be branched or linear.

J can be a $C_{2-30}$ alkylene group having a straight chain, branched chain, or cyclic (including polycyclic) structure. J can be derived from an aromatic dihydroxy compound of formula (3) above. J can be derived from an aromatic dihydroxy compound of formula (4) above. J can be derived from an aromatic dihydroxy compound of formula (6) above.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. J can be a $C_{2-6}$ alkylene group and T can be p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

The polyester unit of a polyester-polycarbonate can be derived from the reaction of a combination of isophthalic and terephthalic diacids (or derivatives thereof) with resorcinol. The polyester unit of a polyester-polycarbonate can be derived from the reaction of a combination of isophthalic acid and terephthalic acid with bisphenol A. The polycarbonate units can be derived from bisphenol A. The polycarbonate units can be derived from resorcinol and bisphenol A in a molar ratio of resorcinol carbonate units to bisphenol A carbonate units of 1:99 to 99:1.

The polycarbonate can be made by a melt polymerization process, which can be a continuous melt process. Generally, in a melt polymerization process, polycarbonates can be prepared by co-reacting, in a molten state, a dihydroxy reactant and a diaryl carbonate (herein also referred to as a diaryl carbonate ester), such as diphenyl carbonate. A useful melt process for making polycarbonates could also use a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing esters. The diaryl carbonate ester to dihydroxy reactant can be present in a molar ratio of 2:1 to 1:2, specifically in a molar ratio of 1.5:1 to 1:1.5, more specifically in a molar ratio of 1.05:1 to 1:1.05, even more specifically in a molar ratio of 1:1.

In addition, transesterification catalyst(s) can be employed. Catalysts used in the melt transesterification polymerization production of polycarbonates can include alpha and/or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkaline earth hydroxides such as magnesium hydroxide and calcium hydroxide. Sources of alkali metal ions can include the alkali metal hydroxides such as illustrated by lithium hydroxide, sodium hydroxide, potassium hydroxide, and combinations comprising at least one of the foregoing. Examples of alkaline earth metal hydroxides are calcium hydroxide, magnesium hydroxide, and combinations comprising at least one of the foregoing. Of these, sodium hydroxide is particularly desirable. The alpha catalyst typically will be used in an amount sufficient to provide $1 \times 10^{-2}$ to $1 \times 10^{-8}$ moles, specifically, $1 \times 10^{-4}$ to $1 \times 10^{-7}$ moles of metal hydroxide per mole of the dihydroxy compounds employed. Other possible sources of alkaline earth and alkali metal ions include salts of carboxylic acids (such as sodium acetate) and derivatives of ethylene diamine tetraacetic acid (EDTA) (such as EDTA tetrasodium salt, and EDTA magnesium disodium salt), as well as combinations comprising at least one of the foregoing. For example, the alpha catalyst can comprise alkali metal salt(s) of a carboxylic acid, alkaline earth metal salt(s) of a carboxylic acid, or a combination comprising at least one of the foregoing. In another example, the alpha catalyst comprises $Na_2Mg$ EDTA or a salt thereof.

The alpha transesterification catalyst can also, or alternatively, comprise salt(s) of a non-volatile inorganic acid. For example, the alpha catalyst can comprise salt(s) of a non-volatile inorganic acid such as $NaH_2PO_3$, $NaH_2PO_4$, $Na_2HPO_3$, $KH_2PO_4$, $CsH_2PO_4$, $Cs_2HPO_4$, and combinations comprising at least one of the foregoing. Alternatively, or in addition, the alpha transesterification catalyst can comprise mixed alkali metal salt(s) of phosphoric acid, such as $NaKHPO_4$, $CsNaHPO_4$, $CsKHPO_4$, and combinations comprising at least one of the foregoing.

Possible beta catalyst(s) can comprise a quaternary ammonium compound, a quaternary phosphonium compound, or a combination comprising at least one of the foregoing. The quaternary ammonium compound can be organic ammonium compound(s) having structure, wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. Optionally, anion $X^-$ can be selected from hydroxide, halide, carboxylate, sulfonate, sulfate, formate, carbonate, and bicarbonate. Some non-limiting examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often employed.

The quaternary phosphonium compound can be of organic phosphonium compounds having structure, wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an anion (e.g., an organic or inorganic anion). Optionally, anion $X^-$ can be selected from hydroxide, halide, alkoxide, aryloxide, carboxylate, sulfonate, sulfate, formate, carbonate, and bicarbonate. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $2(CO_3^{-2})$.

Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often employed.

The amount of beta catalyst employed is typically based upon the total number of moles of dihydroxy compound employed in the polymerization reaction. When referring to the ratio of beta catalyst, for example, phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of beta catalyst (e.g., organic ammonium or phosphonium salts) employed typically will be $1\times10^{-2}$ to $1\times10^{-5}$, specifically $1\times10^{-3}$ to $1\times10^{-4}$ moles per total mole of the dihydroxy compounds in the reaction mixture.

Figure 1:
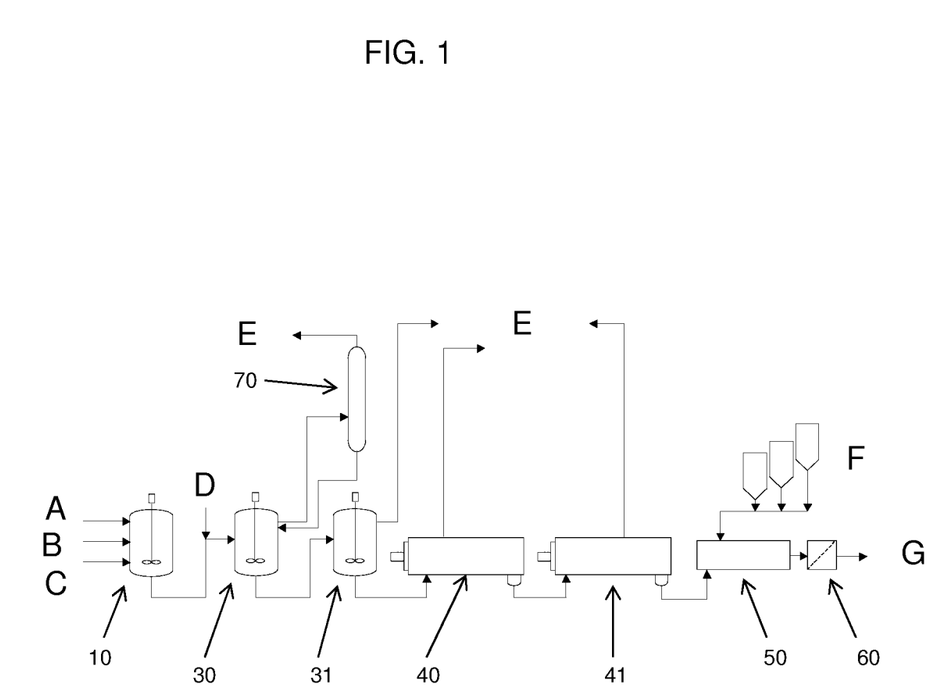
FIG. 1 schematically depicts a plant design for the production of polycarbonate where the reactants are added to a mixer in a polymerization unit.
Figure 2:
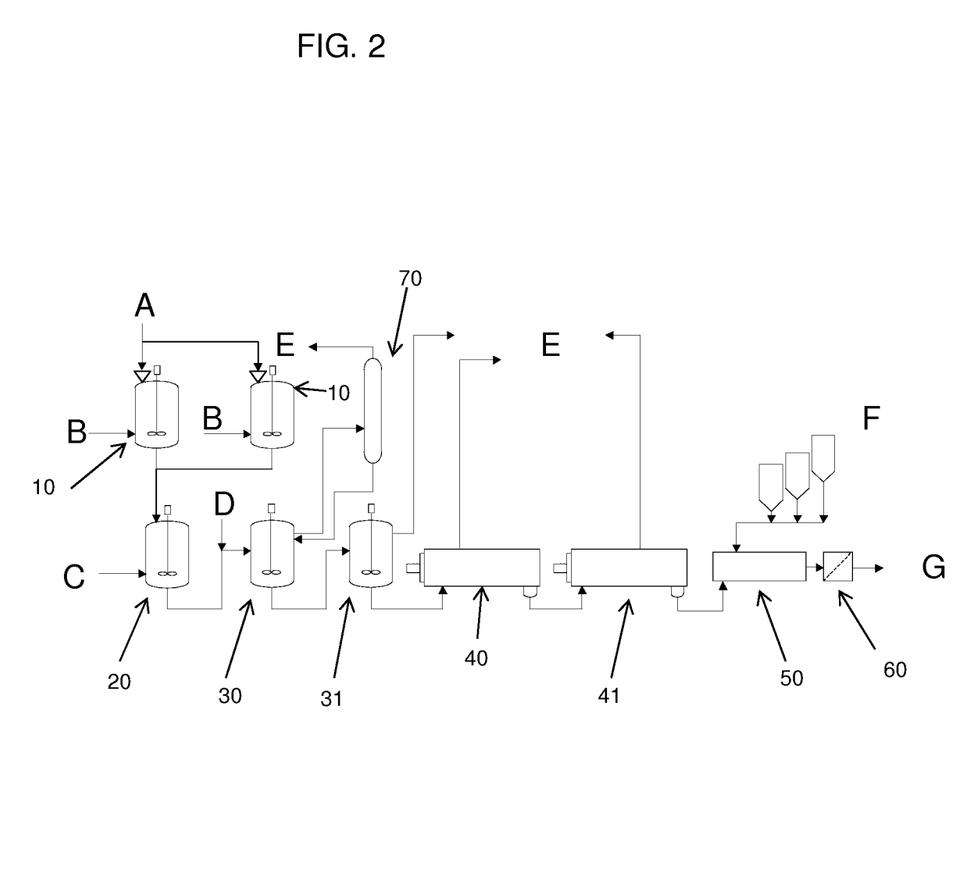
FIG. 2 schematically depicts a plant design for the production of polycarbonate where the reactants are first added to two separate mixers in a polymerization unit.

The polymerization can occur in a polymerization unit; two exemplary polymerization units are illustrated in FIG. 1 and FIG. 2. The polymerization unit can comprise mixer(s) (10), buffer vessel(s) (20), two or more oligomerization stages (30, 31), polymerization stage(s) (40, 41), an extruder(s) (50), a filter(s) (60), a scrubber(s) (70), or combinations comprising one or more of the foregoing. In FIG. 1 the dihydroxy reactant (A), the diaryl carbonate ester (B), and the catalyst (C) are added to a pre-mixer (10). Additional diaryl carbonate ester (D) can optionally be added and the reactants are sent to an oligomerization stage (30). Phenol by-product (E) is removed from the oligomerization stages (30, 31) and from the polymerization stages (40, 41). Any additive (F) is added to the polymerized polycarbonate in the extruder (50). The extruded polycarbonate is filtered in a melt filter (60) to produce polycarbonate pellets (G). FIG. 2 depicts a similar polymerization unit except that the dihydroxy reactant (A) and the diaryl carbonate ester (B) are (e.g., added to two separate pre-mixers operating sequentially in batch mode (10, 11) and then) feed into a buffer vessel (20), where the catalyst (C) is added.

The Applicants surprisingly found that higher amounts of acetone can be fed directly into the polymerization unit without any detrimental effect on the polymerization reaction or to the product of the reaction. Accordingly, the dihydroxy reactant and/or the diaryl carbonate ester can be added to the polymerization unit as a mixture with acetone, referred to as a dihydroxy reactant mixture (A') and a diaryl carbonate ester mixture (B'), respectively. For example, a dihydroxy reactant mixture and a diaryl carbonate ester mixture, a dihydroxy reactant and a diaryl carbonate ester mixture, and/or a dihydroxy reactant mixture and a diaryl carbonate ester can be added to the polymerization unit. The dihydroxy reactant and/or the diaryl carbonate ester can be added, with or without acetone, to the same or to different mixers in the polymerization unit.

The dihydroxy reactant mixture and/or the diaryl carbonate ester mixture can have an acetone concentration of greater than 3 weight %, more specifically greater than or equal to 5 weight %, and yet more specifically, more specifically greater than or equal to 8 weight %, based upon a total weight of the mixture. Optionally, the upper limit of acetone in the mixture is based upon the desired transportation temperature, use of the acetone after transportation, and practicality such as sufficient dihydroxy or diaryl carbonate ester for use in subsequent reactions. Since the acetone can be used to make BPA, it can be beneficial to have the amount of acetone in the mixture near the stoichiometric amount for producing the BPA, wherein the stoichiometric amount is based upon weight. Excess acetone would entail unnecessary costs of transportation to the site and a need sell the surplus, while a deficiency would result in purchasing additional acetone to make up the difference, and will affect the needed transportation temperature of the mixture. Hence, the mixture can have a concentration of 3 to 35 weight % acetone, specifically 5 to 30 weight % acetone, and more specifically, 10 weight % to 25 weight % acetone or 20 weight % to 35 weight % acetone, based upon a total weight of the mixture. The molar ratio of acetone to dihydroxy reactant can be greater than or equal to 0.1:1, specifically 0.1:1 to 9:1. The molar ratio of dihydroxy reactant to diaryl carbonate ester to acetone can be stoichiometric in a mole ratio of 1:1:1. The acetone concentration can be adjusted before and/or during the reaction, e.g., by adding other component(s). Additional dihydroxy reactant and/or the diaryl carbonate ester can be added to attain and/or maintain the desired molar ratio between the dihydroxy reactant and the diaryl carbonate ester.

As acetone can be recovered from the polymerization unit (e.g., acetone can be recovered after the polycarbonate has been formed), the acetone does not need to be pre-separated prior to the addition of either or both of the dihydroxy reactant mixture and the diaryl carbonate ester mixture. In other words, the mixture is added to the polymerization unit and acetone is not separated from the mixture prior to the addition of the catalyst. As used herein, "not separated" refers to the acetone remaining in the vessel comprising the the mixture. In other words, although the acetone may be present in a liquid or gaseous phase in the vessel, it is not withdrawn from the vessel, e.g., prior to the addition of the catalyst.

Acetone can be easily recovered due to the differences in volatilities between the dihydroxy reactant, the diaryl carbonate ester, the phenol byproduct, and the polymerized product at the operating conditions used in the polymerization unit (150° C.<T<320° C., 0.3 mbara<P<atm). As such, acetone can optionally be recovered after the melt polymerization reaction forming the polycarbonate, e.g., from different sections of the polymerization unit. The separation device utilized to remove the acetone can be selected to avoid the loss of unreacted diaryl carbonate ester and any other volatile components from the reaction mixture. The separation device can optionally comprise single or multiple separation steps located after the polymerization unit.

Likewise, the phenol by-product can be recovered. The phenol by-product can be recovered in the same separation step(s) as the acetone separation and/or in a separate separation step(s). When the phenol by-product and the acetone are separated in a same separation step, they can be removed in the same product stream and optionally separated or can be reacted to produce additional dihydroxy reactant.

The recovered acetone can be reacted with the recovered phenol by-product to make the dihydroxy reactant and the recovered phenol by-product can be reacted with, for example phosgene or a dialkyl carbonate, to make diaryl carbonate ester, where the dihydroxy reactant and/or the diaryl carbonate ester produced from the recovered products can be added to the polymerization unit to be polymerized. For example, it can be added to the polymerization unit to adjust its molar ratio with respect to the acetone as desired.

Figure 3:
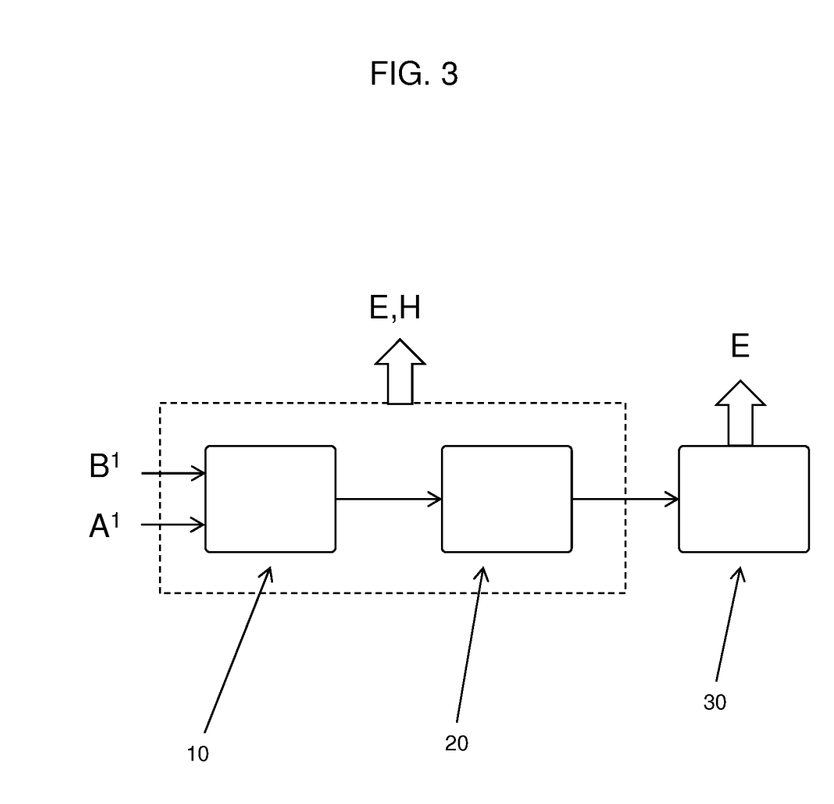
FIG. 3 schematically depicts a plant design for the production of polycarbonate where the reactants or reactant mixtures with acetone are added to a mixer in a polymerization unit and acetone is recovered from one or both of a pre-mixture vessel and a buffer vessel in the polymerization unit.
Figure 4:
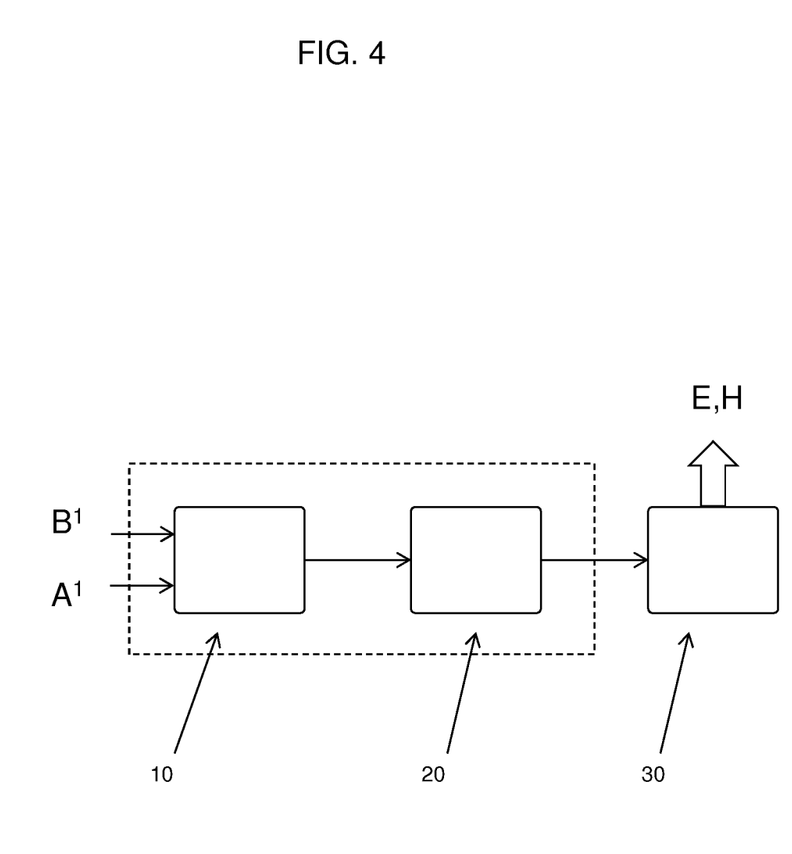
FIG. 4 schematically depicts a plant design for the production of polycarbonate where the reactants or reactant mixtures with acetone are added to a mixer in a polymerization unit and acetone is recovered from an oligomerization vessel in the polymerization unit.
Figure 5:
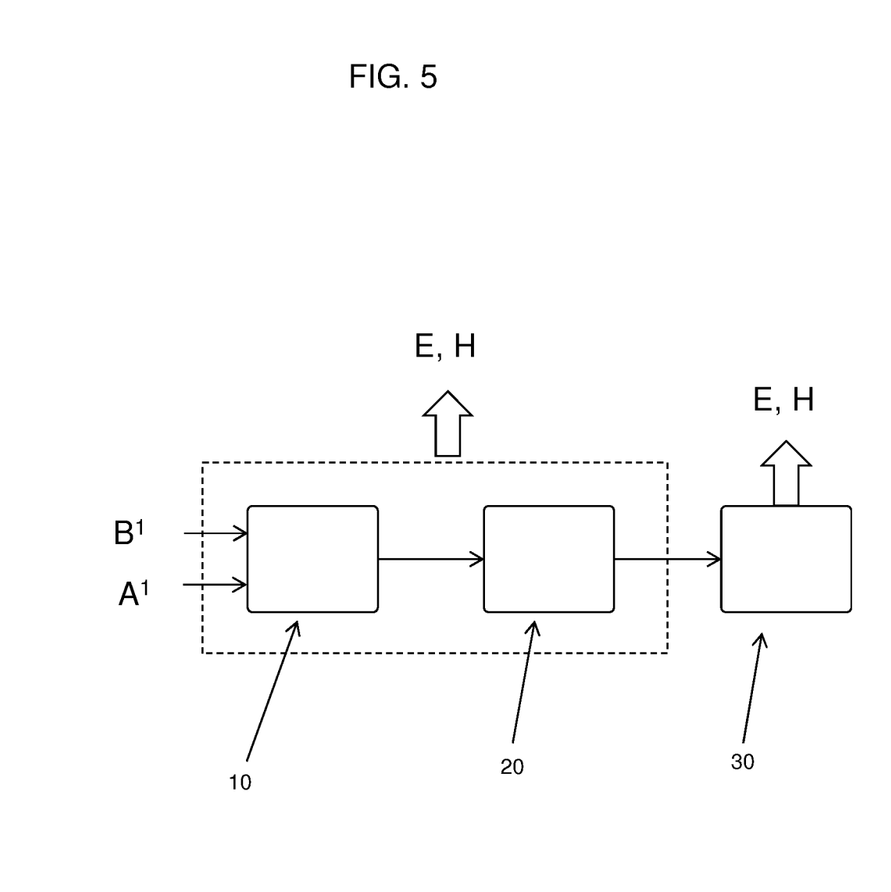
FIG. 5 schematically depicts a plant design for the production of polycarbonate where the reactants or reactant mixtures with acetone are added to a mixer in a polymerization unit and acetone is recovered from one or more of a pre-mixture vessel and a buffer vessel as well as from an oligomerization vessel in the polymerization unit.

FIG. 3, FIG. 4, and FIG. 5 illustrate different manners in which acetone (H) and/or phenol by-product (E) can be removed. FIG. 3 illustrates a first removal option, wherein acetone (H) and/or phenol by-product (E) are recovered from a pre-mixer (10) and/or a buffer vessel (20). The recovery can occur based on selecting a combination of temperature and pressure in the pre-mixer (10) and/or buffer vessel (20) that allows for the devolatilization of acetone (H) and/or phenol by-product (E) from the monomer mixture. For example, the conditions for such a removal can be at a temperature of 160 to 180° C. and atmospheric pressure and can result in greater than or equal to 95 weight % of the acetone (H).

FIG. 4 illustrates a second removal option, wherein the acetone (H) and/or phenol by-product (E) can be recovered in the first oligomerization stage (30), where acetone (H) can be recovered together with the phenol by-product (E), or as an independent stream. In order to prevent acetone (H) and/or other monomers like (A) or (B) from leaving the monomer mixture prior to entering the oligomerization stage (30), the pressure can be increased to greater than atmospheric pressure in the stage(s) prior to the oligomerization stage (30).

FIG. 5 illustrates a third removal option, wherein the acetone (H) and/or phenol by-product (E) is recovered from a pre-mixer (10) and/or a buffer vessel (20) as well as in a first oligomerization stage (30). Here, greater than or equal to 95 weight % of the acetone (H) can be recovered in the pre-mixer (10) and/or a buffer vessel (20) and from the first oligomerization stage (30). The relative removal percentages in pre-mixer (10) and/or buffer (20) and the oligomerizer (30) can be adjusted depending on the operating conditions. For example, acetone (H) removal in pre-mixer and/or buffer vessel (20) can be up to 95 weight % (e.g., greater than 0 to 95 weight %) of the total acetone in the mixture (e.g., the acetone fed to the polymerization unit together with BPA (A') or DPC (B') or both). The balance can optionally be removed in oligomerizer (30).

In any of these options, phenol by-product (E) can be removed in subsequent reaction steps, e.g., from a secondary oligomerization stage(s) and/or from a polymerization stage(s). Furthermore, any combination of these removal options can be employed as well as combinations comprising at least one of the above removal options.

After polymerization, the polycarbonate can be extruded and optionally filtered to form a polycarbonate composition. The polycarbonate composition can comprise another polymer(s), for example another, different, polycarbonate, a polyester, a polysiloxane, additives (e.g., an impact modifier(s), stabilizer(s), colorant(s), flame retardant(s), etc.), or one or more of the foregoing to form a polycarbonate blend.

The additive can include various additives, with the proviso that the additive(s) are selected so as to not significantly adversely affect the desired properties of the thermoplastic composition. Such additives can be mixed at a suitable time during the mixing of the components for forming the composition. The additive can include impact modifiers, fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, anti-drip agents, or combinations comprising one or more of the foregoing. The total amount of additives (other than any impact modifier, filler, or reinforcing agents) can be 0.01 to 5 weight %, based on the total weight of the composition.

The impact modifier can include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), or a combination comprising one or more of the foregoing. The thermoplastic composition can be essentially free of chlorine and bromine. Essentially free of chlorine and bromine refers to materials produced without the intentional addition of chlorine or bromine or chlorine or bromine containing materials. It is understood however that in facilities that process multiple products, a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to 100 parts per million by weight (ppm), less than or equal to 75 ppm, or less than or equal to 50 ppm. When this definition is applied to the fire retardant, it is based on the total weight of the fire retardant. When this definition is applied to the thermoplastic composition, it is based on the total weight of the composition, excluding any filler.

Transparent compositions can be produced by manipulation of the process used to manufacture the polycarbonate composition. One example of such a process to produce transparent polycarbonate compositions is described in U.S. Patent Application No. 2003/0032725.

In an embodiment, a method for producing polycarbonate by melt polymerization, can comprise: (a) making a mixture containing acetone and diarylcarbonate; (b) transporting the mixture (e.g., in the liquid phase) to a polycarbonate production plant that carries out said melt polymerization; (c) without separating out acetone from the mixture, adding the mixture to a melt polymerization unit (e.g., by itself or with other reactants); (d) adding a dihydroxy compound to the melt polymerization unit; (e) adding a catalyst to the melt polymerization unit; and (f) operating the melt polymerization unit under conditions so that the dihydroxy compound reacts with the diaryl carbonate to produce polycarbonate with a desired specification, and a phenol by-product.

In another embodiment, a method for producing polycarbonate by melt polymerization can comprise: (a) adding acetone, diaryl carbonate, and dihydroxy compound to the melt polymerization unit, without separating out acetone prior to the melt polymerization unit, wherein the acetone is added to the melt polymerization unit as a mixture with the diaryl carbonate and/or the dihydroxy compound; (b) adding a catalyst to the melt polymerization unit, without separating out acetone prior to the addition of the catalyst; and (c) operating the melt polymerization unit under conditions so that the dihydroxy compound reacts with the diaryl carbonate to produce polycarbonate with a desired specification, and a phenol by-product.

In another embodiment, a method for producing polycarbonate by melt polymerization can comprise: (a) adding acetone, diaryl carbonate, and dihydroxy compound to the melt polymerization unit, without separating out acetone prior to the melt polymerization unit, wherein the acetone is added to the melt polymerization unit as a mixture with the diaryl carbonate and/or the dihydroxy compound; (b) adding a catalyst to the melt polymerization unit, without changing the concentration of acetone in the mixture prior to the addition of the catalyst; and (c) operating the melt polymerization unit under conditions so that the dihydroxy compound reacts with the diaryl carbonate to produce polycarbonate with a desired specification, and a phenol by-product.

In another embodiment, a method for producing polycarbonate by melt polymerization can comprise: (a) adding acetone, diaryl carbonate, and dihydroxy compound to the melt polymerization unit, without separating out acetone prior to the melt polymerization unit, wherein the acetone is added to the melt polymerization unit as a mixture with the diaryl carbonate and/or the dihydroxy compound, and without changing the concentration of acetone in the mixture prior to the addition of the with the diaryl carbonate or the dihydroxy compound that is not in the mixture; (b) adding a catalyst to the melt polymerization unit; and (c) operating the melt polymerization unit under conditions so that the dihydroxy compound reacts with the diaryl carbonate to produce polycarbonate with a desired specification, and a phenol by-product.

In still another embodiment, a method for producing polycarbonate can comprise: (a) adding a diaryl carbonate, a dihydroxy compound, and acetone to a melt polymerization unit, wherein the acetone is added as part of a mixture comprising the diaryl carbonate and/or the dihydroxy compound, and the acetone in an amount of greater than 3 weight % based upon a total weight of the mixture; (b) adding a catalyst to the melt polymerization unit; and (c) operating the melt polymerization unit under conditions so that the diaryl carbonate reacts with the dihydroxy compound to produce polycarbonate with a desired specification, and a phenol by-product.

In still another embodiment, a method for producing polycarbonate can comprise: (a) adding a diaryl carbonate, a dihydroxy compound, and acetone to a melt polymerization unit, wherein the acetone is added as part of a mixture comprising the diaryl carbonate and/or the dihydroxy compound, and the acetone in an amount of greater than or equal to 10 weight % based upon a total weight of the mixture; (b) adding a catalyst to the melt polymerization unit; and (c) operating the melt polymerization unit under conditions so that the diaryl carbonate reacts with the dihydroxy compound to produce polycarbonate with a desired specification, and a phenol by-product.

In yet another embodiment, a method for producing polycarbonate by melt polymerization can comprise: adding a dihydroxy reactant and a diaryl carbonate ester to a melt polymerization unit, wherein at least one of the dihydroxy compound and the diaryl carbonate is added as a mixture with acetone, wherein the diaryl carbonate to dihydroxy reactant is present in a molar ratio of 2:1 to 1:2, and wherein the amount of acetone is adjusted in the polymerization unit such that the molar ratio of acetone to dihydroxy reactant is greater than or equal to 0.1:1; prior to separation or recovery of the acetone from the melt polymerization unit, reacting the dihydroxy compound and the diaryl carbonate in the presence of a catalyst to produce polycarbonate and at least a phenol by-product.

In yet another embodiment, a method for producing polycarbonate by melt polymerization can comprise: (a) adding acetone, diaryl carbonate, and dihydroxy compound to the melt polymerization unit, wherein the acetone is added to the melt polymerization unit as a mixture with the diaryl carbonate and/or the dihydroxy compound; (b) adding a catalyst to the melt polymerization unit, without separating out acetone prior to the addition of the catalyst; and (c) operating the melt polymerization unit under conditions so that the dihydroxy compound reacts with the diaryl carbonate to produce polycarbonate with a desired specification, and a phenol by-product.

In another embodiment, a method for producing polycarbonate by melt polymerization can comprise: (a) adding acetone, diaryl carbonate, and dihydroxy compound to the melt polymerization unit, wherein the acetone is added to the melt polymerization unit as a mixture with the diaryl carbonate and/or the dihydroxy compound, and without removing acetone prior to the melt polymerization unit; (b) adding a catalyst to the melt polymerization unit; and (c) operating the melt polymerization unit under conditions so that the dihydroxy compound reacts with the diaryl carbonate to produce polycarbonate with a desired specification, and a phenol by-product.

In another embodiment, a method for producing polycarbonate by melt polymerization can comprise: (a) adding acetone, diaryl carbonate, and dihydroxy compound to the melt polymerization unit, without separating out acetone prior to the melt polymerization unit; (b) adding a catalyst to the melt polymerization unit, without separating out acetone prior to the addition of the catalyst; and (c) operating the melt polymerization unit under conditions so that the dihydroxy compound reacts with the diaryl carbonate to produce polycarbonate with a desired specification, and a phenol by-product. Optionally: (i) acetone (i.e., the acetone in the mixture) is recovered from one or more of a pre-mixture vessel, a buffer vessel, and an oligomerization vessel; and/or (ii) no acetone is removed via distillation prior to the formation of the mixture; and/or (iii) greater than or equal to 95 weight % of the acetone is recovered from one or both of the pre-mixture vessel and the buffer vessel and the remaining acetone is recovered from the oligomerization vessel.

In still another embodiment, a method for producing polycarbonate by melt polymerization can comprise: adding a catalyst and a mixture comprising diaryl carbonate, dihydroxy compound, and greater than or equal to 8 weight % acetone (based upon a total weight of the mixture), to a melt polymerization unit; and operating the melt polymerization unit at a temperature of 150° C. to 320° C. and a pressure of 0.3 millibar absolute to 1 atm to produce polycarbonate. Optionally: (i) acetone (i.e., the acetone in the mixture) is recovered from one or more of a pre-mixture vessel, a buffer vessel, and an oligomerization vessel; and/or (ii) no acetone is removed via distillation prior to the formation of the mixture; and/or (iii) greater than or equal to 95 weight % of the acetone is recovered from one or both of the pre-mixture vessel and the buffer vessel and the remaining acetone is recovered from the oligomerization vessel.

In the various embodiments: (i) the acetone is present in the mixture added to the melt polymerization unit in an amount of greater than 3 weight %, based upon a total weight of the mixture: and/or (ii) ±10% of stoichiometric amounts of the acetone and diarylcarbonate are used to make the mixture that is used in the melt polymerization unit to make the polycarbonate; or (iii) the molar ratio of acetone to diarylcarbonate in step (a) is 0.12 to 2; or (iv) the molar ratio of acetone to diarylcarbonate in step (a) is 0.195 to 1.58; or (v) the mixture of acetone and diaryl carbonate has 18.7 weight % to 28.8 weight % acetone, based upon a total weight of the mixture; or (vi) the mixture added to the polymerization reactor contains greater than or equal to 15.2 weight % acetone, based upon a total weight of the mixture; or (vii) the molar ratio of acetone to diarylcarbonate is 0.41 to 1.23; or (viii) the molar ratio of dihydroxy compound to diaryl carbonate to acetone is 1:1:1; or (ix) the mixture added to the polymerization reactor contains 20 weight % to 35 weight % acetone, based upon a total weight of the mixture. Furthermore, the various embodiments can optionally further comprise and/or alternatively comprise: (i) further comprising reacting the phenol by-product with the acetone to produce a bisphenol; and/or (ii) further comprising using the produced bisphenol to produce additional polycarbonate; and/or (iii) the diaryl carbonate is diphenyl carbonate and the dihydroxy compound is a bisphenol; and/or (iv) the dihydroxy compound is a BPA; and/or further comprising receiving the acetone and the diaryl carbonate as the mixture prior to addition to the melt polymerization unit; and/or (v) further comprising receiving the acetone and the dihydroxy compound as the mixture prior to addition to the melt polymerization unit; and/or (vi) wherein acetone is only separated subsequent to reacting the diaryl carbonate and the dihydroxy compound; and/or (vii) one or both of the pre-mixture vessel and the buffer vessel are at a temperature of 160 to 180° C. and are at atmospheric pressure; and/or (viii) the pressure of any pre-mixture or buffer vessel prior to the oligomerization vessel is greater than atmospheric; and/or (ix) further comprising reacting the acetone with the recovered phenol by-product to make bisphenol and adding the bisphenol to the melt polymerization unit; and/or (x) wherein the acetone is derived from a biological source; and/or (xi) wherein the biological source is corn; and/or (xii) wherein the acetone is not separated from the mixture before the addition of the catalyst (in other words, the acetone is not being removed from the vessel comprising the remainder of the mixture before the addition of the catalyst); and/or (xiii) comprising no distillation treatment of the mixture before the addition of the catalyst; and/or (xiv) wherein the acetone is not separated from the mixture before reacting the diaryl carbonate and the dihydroxy compound; and/or (xv) wherein the catalyst comprises an alpha catalyst and/or a beta catalyst; and/or (xvi) the catalyst comprises an alpha catalyst comprise at least one of $NaH_2PO_3$, $NaH_2PO_4$, $Na_2HPO_3$, $KH_2PO_4$, $CsH_2PO_4$, and $Cs_2HPO_4$; and/or (xvii) wherein the catalyst comprises at least one of tetramethyl phosphonium hydroxide, tetramethyl phosphonium acetate, tetramethyl phosphonium formate, tetrabutyl phosphonium hydroxide, tetrabutyl phosphonium acetate, tetraphenyl phosphonium acetate, and tetraphenyl phosphonium phenoxide; and/or (xvii) wherein the conditions are a temperature of 150° C. to 320° C. and a pressure of 0.3 millibar absolute to 1 atm; and/or (xviii) no acetone is removed via distillization prior to the formation of the mixture (comprising acetone, diaryl carbonate(s), and dihydroxy compound(s)).

The following examples are provided to illustrate that monomer feed streams comprising greater than 3 weight % acetone can be used to polymerize polycarbonate in melt polymerizations without detrimental effects on the process or on the properties of the resultant polymer. The examples are merely illustrative and are not intended to limit devices made in accordance with the disclosure to the materials, conditions, or process parameters set forth therein.

EXAMPLES

Example 1

(Comparative): Preparation of Polycarbonate from Purified Monomer Sources

Diphenol carbonate (DPC, solid) and bisphenol A (BPA, solid) were added in a mass ratio of 1.065 to a stainless steel vessel under stirring. A catalyst mixture of 50 microequivalents per mole of bisphenol A of tetrabutylphosphonium acetate (TBPA, in aqueous solution at 3.2 weight %) and 0.5 microequivalents per mole of bisphenol A of $NaKHPO_4$ was added to the vessel. The vessel was heated to 220° C. at atmospheric pressure under nitrogen and maintained at these conditions for 2 hours. This procedure was repeated 4 times and the average results are shown in Table 1.

Example 2

Preparation of Polycarbonate from A Bisphenol A/Acetone Mixture

The procedure of Comparative Example 1 was used except that the bisphenol A was first dissolved in acetone such that the mixture contained 15.2 weight % acetone, based upon a total weight of the mixture. Once the catalyst was combined with the mixture, the amount of acetone was 8.5 weight % based upon the total of the mixture and catalyst. This procedure was repeated 3 times and the average results are shown in Table 1.

Example 3

Preparation of Polycarbonate from A Diphenyl Carbonate/Acetone Mixture

The procedure of Comparative Example 1 was used except that the diphenyl carbonate was first dissolved in acetone such that the mixture contained 30 weight % acetone. Once the catalyst was combined with the mixture, the amount of acetone was 17.2 weight % based upon the total of the mixture and catalyst. This procedure was repeated 2 times and the average results are shown in Table 1.

Table 1 shows the composition (% phenol by-product) and percent conversion (oligomers generated) as determined by high-performance liquid chromatography (HPLC), where the weight percentages (wt %) are net after discounting acetone. St. Dev. stands for standard deviation.

TABLE 1

| | Example | | | | | |
|---|---|---|---|---|---|---|
| | 1 | | 2 | | 3 | |
| Component | Mean (wt %) | St. Dev. (wt %) | Mean (wt %) | St. Dev. (wt %) | Mean (wt %) | St. Dev. (wt %) |
| Phenol, by-product | 20.3 | 0.4 | 20.6 | 0.6 | 20.1 | 1.4 |
| DPC | 10.3 | 0.2 | 10.2 | 0.1 | 10.4 | 0.1 |
| BPA | 12.8 | 9.2 | 13.2 | 0.1 | 12.1 | 0.3 |
| Oligomers | 56.0 | 0.6 | 55.3 | 0.7 | 56.0 | 1.6 |
| Others | 0.7 | 0.1 | 0.6 | 0.1 | 0.5 | 0.3 |

Table 1 shows that experiments with and without different levels of acetone yield similar values of conversion as expressed in percentages of phenol by-product and oligomers generated and in the remaining amounts of bisphenol A and diphenyl carbonate. These values as shown in Table 1 are not statistically different as determined by analysis of variance (ANOVA) means. These results indicate that there is no effect of larger levels of acetone on the oligomerization process.

In other words, as is clear from the examples, a mixture of acetone, diaryl carbonate and dihydroxy compound can be introduced and used in a polymerization unit without prior distillation of the mixture (e.g., to remove the acetone). Actually, the mixture can be used wherein acetone is not separated from the mixture before the addition of the catalyst. Optionally, in any of the embodiments, there is no distillation treatment of the mixture before the addition of the catalyst (e.g., the process is free of distillation treatments of the mixture prior to the addition of the catalyst).

It was unexpectedly discovered that acetone could remain in the mixture (with the diaryl carbonate(s) and the dihydroxy compound(s)), without adversely affecting the reaction, even in the presence of a catalyst and under reaction conditions (e.g., temperature of 150° C. to 320° C. and a pressure of 0.3 millibar absolute to 1 atm). The high levels of acetone (e.g., greater than or equal to 10 weight % based upon a total weight of the mixture (acetone, diaryl carbonate(s), and dihydroxy compound(s)) did not adversely affect the melt polymerization process, e.g., did not result in side reactions or unwanted by-products due to acetone reactions. Hence, the process can be simplified, eliminating the need for a pre-separation step wherein the acetone concentration is reduced to less than 3 weight % prior to the addition of the remaining reactant (e.g., diaryl carbonate(s) or dihydroxy compound(s)).

In other words, previously, a mixture of acetone with diaryl carbonate or dihydroxy compound could be purchased. The concentration of the acetone would be reduced to less than 3 weight % prior to the addition of the other reactant (i.e., the diaryl carbonate or the dihydroxy compound that was not part of the mixture).

In the present process it was discovered that the concentration of the acetone in the mixture (e.g., in the vessel containing the mixture) can be maintained (e.g., does not need to be reduced) prior to the addition of the other reactant. It does not even need to be reduced (e.g., removed from the vessel containing the mixture, other reactant, and catalyst) prior to reacting the diaryl carbonate with the dihydroxy compound.

The singular forms "a," "an," and "the" include plural referents unless the context clearly dictates otherwise. "Or" means "and/or." The endpoints of all ranges directed to the same component or property are inclusive and independently combinable (e.g., ranges of "less than or equal to 25 weight %, or 5 weight % to 20 weight %," is inclusive of the endpoints and all intermediate values of the ranges of "5 weight % to 25 weight %," etc.). The suffix "(s)" is intended to include both the singular and the plural of the term that it modifies, thereby including at least one of that term (e.g., the colorant(s) includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this disclosure belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

While the disclosure has been described with reference to an exemplary embodiment, it will be understood by those skilled in the art that various changes can be made and equivalents can be substituted for elements thereof without departing from the scope of the disclosure. In addition, many modifications can be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

We claim:

1. A method for producing polycarbonate by melt polymerization, comprising:
   (a) adding acetone, diaryl carbonate, and dihydroxy compound to a melt polymerization unit, wherein the acetone is added to the melt polymerization unit as a mixture with the diaryl carbonate and/or the dihydroxy compound;
   (b) adding a catalyst to the melt polymerization unit, without separating out acetone prior to the addition of the catalyst; and
   (c) operating the melt polymerization unit under conditions so that the dihydroxy compound reacts with the diaryl carbonate to produce polycarbonate with a desired specification, and a phenol by-product.

2. The method of claim 1, wherein the acetone is present in the mixture added to the melt polymerization unit in an amount of greater than 3 weight %, based upon a total weight of the mixture.

3. A method for producing polycarbonate, comprising:
   (a) adding a diaryl carbonate, a dihydroxy compound, and acetone to a melt polymerization unit, wherein the acetone is added as part of a mixture comprising
      the diaryl carbonate and/or the dihydroxy compound; and
      the acetone in an amount of greater than 3 weight % based upon a total weight of the mixture;
   (b) adding a catalyst to the melt polymerization unit; and
   (c) operating the melt polymerization unit under conditions so that the diaryl carbonate reacts with the dihydroxy compound to produce polycarbonate with a desired specification, and a phenol by-product.

4. A method for producing polycarbonate by melt polymerization, comprising:
   (a) making a mixture containing acetone and diarylcarbonate;
   (b) transporting the mixture to a polycarbonate production plant that carries out said melt polymerization;
   (c) adding the mixture to a melt polymerization unit,
   (d) adding a dihydroxy compound to the melt polymerization unit;
   (e) adding a catalyst to the melt polymerization unit, without separating out acetone prior to the addition of the catalyst; and
   (f) operating the melt polymerization unit under conditions so that the dihydroxy compound reacts with the diaryl carbonate to produce polycarbonate with a desired specification, and at least a phenol by-product.

5. The method of claim 4, wherein the temperature during the transporting step in the range of from 15° C. to 70° C.

6. The method of claim 1, wherein ±10% of stoichiometric amounts of the acetone and diarylcarbonate are used to make the mixture that is used in the melt polymerization unit to make the polycarbonate.

7. The method of claim 1, wherein the molar ratio of acetone to diarylcarbonate in the mixture is 0.12 to 2.

8. The method of claim 1, wherein the molar ratio of acetone to diarylcarbonate in the mixture is 0.195 to 1.58.

9. The method of claim 1, wherein the mixture of acetone and diaryl carbonate has 18.7 weight % to 28.8 weight % acetone, based upon a total weight of the mixture.

10. The method of claim 1, wherein the mixture added to the polymerization unit contains greater than or equal to 15.2 weight % acetone, based upon a total weight of the mixture.

11. The method of claim 1, wherein the molar ratio of acetone to diarylcarbonate is 0.41 to 1.23.

12. A method for producing polycarbonate by melt polymerization comprising:
   adding a dihydroxy reactant and a diaryl carbonate ester to a melt polymerization unit, wherein at least one of the dihydroxy compound and the diaryl carbonate is added as a mixture with acetone, wherein the diaryl carbonate to dihydroxy reactant is present in a molar ratio of 2:1 to 1:2, and
   prior to separation or recovery of the acetone from the melt polymerization unit, reacting the dihydroxy compound and the diaryl carbonate in the presence of a catalyst to produce polycarbonate and a phenol by-product;
   wherein the amount of acetone is adjusted in the polymerization unit such that the molar ratio of acetone to dihydroxy reactant is greater than or equal to 0.1:1.

13. The method of claim 12, wherein the molar ratio of dihydroxy compound to diaryl carbonate to acetone is 1:1:1.

14. The method of claim 1, further comprising reacting the phenol by-product with the acetone to produce a bisphenol.

15. The method of claim 14, further comprising using the produced bisphenol to produce additional polycarbonate.

16. The method of claim 1, wherein the diaryl carbonate is diphenyl carbonate and the dihydroxy compound is a bisphenol.

17. The method of claim 1, wherein the dihydroxy compound a BPA.

18. The method of claim 1, further comprising, receiving the acetone and the diaryl carbonate as the mixture prior to addition to the melt polymerization unit.

19. The method of claim 1, further comprising, receiving the acetone and the dihydroxy compound as the mixture prior to addition to the melt polymerization unit.

20. The method of claim 1, wherein the catalyst comprises an alpha catalyst and/or a beta catalyst.

21. The method of claim 1, wherein the catalyst comprises an alpha catalyst comprise at least one of $NaH_2PO_3$, $NaH_2PO_4$, $Na_2HPO_3$, $KH_2PO_4$, $CsH_2PO_4$, and $Cs_2HPO_4$.

22. The method of claim 1, wherein the catalyst comprises at least one of tetramethyl phosphonium hydroxide, tetramethyl phosphonium acetate, tetramethyl phosphonium formate, tetrabutyl phosphonium hydroxide, tetrabutyl phosphonium acetate, tetraphenyl phosphonium acetate, and tetraphenyl phosphonium phenoxide.

23. The method of claim 12, wherein acetone is only separated subsequent to reacting the diaryl carbonate and the dihydroxy compound.

24. The method of claim 12, wherein the phenol by-product is recovered from one or more of a pre-mixture vessel, a buffer vessel, and an oligomerization vessel in the polymerization unit.

25. The method of claim 24, wherein the pressure of any pre-mixture or buffer vessel prior to the oligomerization vessel is greater than atmospheric.

26. The method of claim 1, wherein the acetone is derived from a biological source.

27. The method of claim 26, wherein the biological source is corn.

* * * * *